United States Patent [19]
Ferguson

[11] 3,954,019
[45] May 4, 1976

[54] ADJUSTMENT AND LOCKING MECHANISM FOR ADJUSTABLE CONTROL DEVICE

[76] Inventor: George R. Ferguson, Rte. 2, Clover, S.C. 29407

[22] Filed: June 3, 1974

[21] Appl. No.: 475,833

[52] U.S. Cl................................. 74/527; 74/528
[51] Int. Cl.² .......................................... G05G 1/04
[58] Field of Search..................... 74/527, 528, 553; 184/55 R, 55 A

[56] References Cited
UNITED STATES PATENTS

| | | | |
|---|---|---|---|
| 2,797,591 | 7/1957 | Marrapese | 74/528 |
| 3,707,204 | 12/1972 | Dussardier | 74/527 X |

*Primary Examiner*—Samuel Scott
*Assistant Examiner*—Frank H. McKenzie, Jr.

[57] ABSTRACT

An adjustable control device, including a housing having an adjustment shaft rotatably mounted in and extending outwardly therefrom, is provided with means to facilitate manual adjustment of the shaft and for locking the same in a desired adjusted position. The means comprises an enlarged adjustment cap which is mounted for rotation with the adjustment shaft for permitting adjusting the rotational position thereof and which is also mounted for axial movement along the shaft between a first axial position permitting rotational adjustment of the shaft and a second axial position locking the shaft against undesired rotational movement.

10 Claims, 6 Drawing Figures

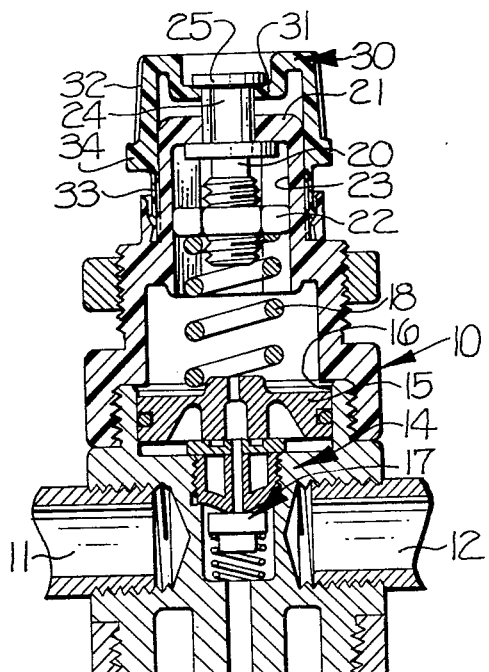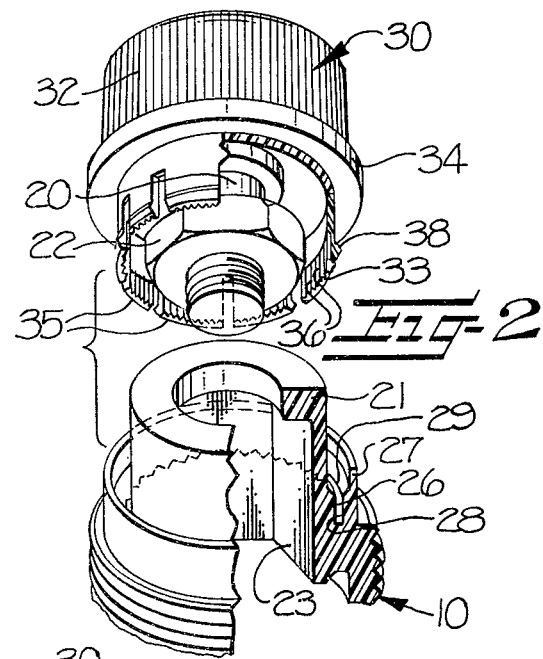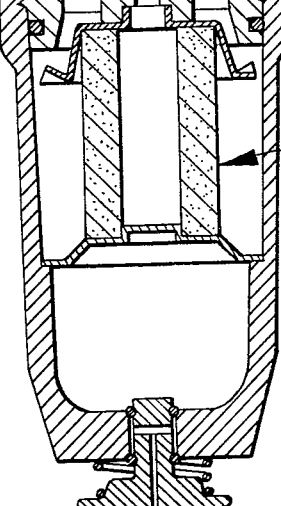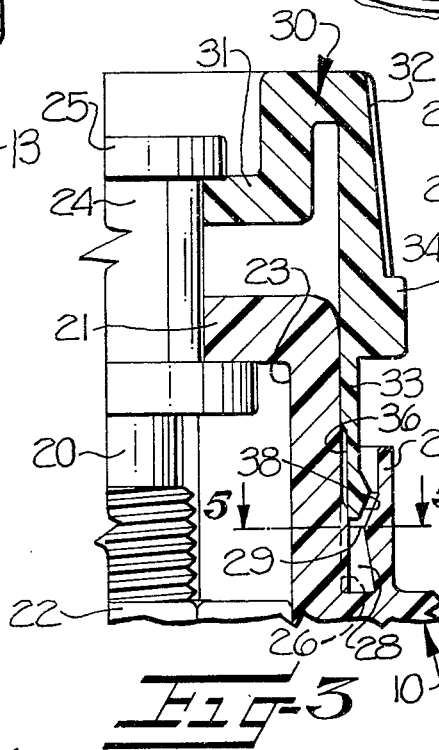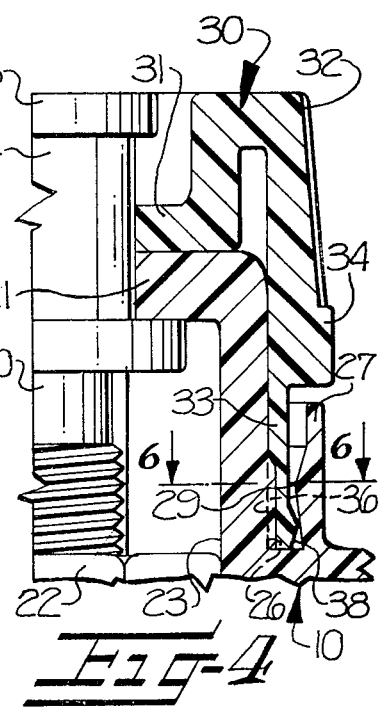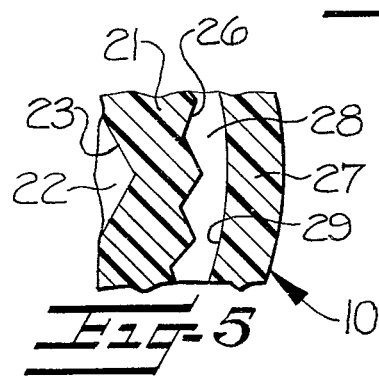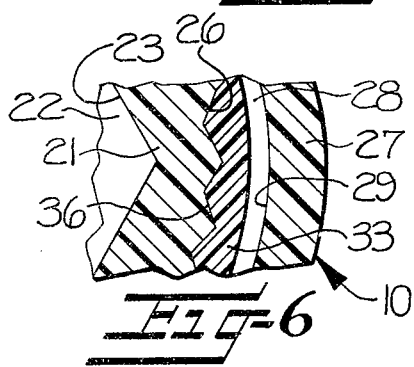

ADJUSTMENT AND LOCKING MECHANISM FOR ADJUSTABLE CONTROL DEVICE

This invention relates to a device for facilitating manually adjusting a rotatable shaft and for permitting locking the shaft in a desired adjusted position.

Adjustable control devices, such as air line pressure regulators for example, often require manual adjustment to the control settings thereof. Such adjustments are conventionally made by changing the rotational position of an adjustment shaft provided in the control device for this purpose. To prevent accidental disturbance of the control setting after adjustment, means are often provided for locking the adjustment shaft of the control device in a desired position after adjustment.

One conventional means for locking a rotatable adjustment shaft is disclosed in Miller et al U.S. Pat. No. 3,574,469, issued Mar. 30, 1971. This patent discloses an air line pressure regulator wherein a lock nut is provided on the externally threaded adjustment shaft thereof adapted for being tightened against the housing of the pressure regulator after the desired setting of the adjustment shaft has been obtained to thereby immobilize the shaft against rotation. It is apparent that this type of locking arrangement is slow and cumbersome, particularly where frequent adjustments are necessary or where the control device is in a relatively inaccessible location, since adjustment of the device requires the use of both hands, together with a use of a suitable tool such as a wrench for tightening the lock nut.

Other locking arrangements have been proposed for various applications which are self contained and do not require the use of additional tools for effecting adjustment and locking. For example, Dussardier U.S. Pat. No. 3,707,204, issued Dec. 26, 1972, discloses an arrangement whereby a shaft may be rotatably adjusted by means of a control knob and wherein a separate ring is provided beneath the control knob which may be moved axially after the knob has been adjusted to lock the knob against rotation.

The present invention is primarily concerned with providing a means by which a rotatable adjustment shaft may be manually adjusted to a desired position and thereafter locked in the desired adjusted position, and wherein the adjustment and locking is easily and accurately accomplished by moving a single adjustment cap.

More specifically, it is an object of the present invention to provide an improved adjustment and locking mechanism for an adjustable control device wherein the adjustment and locking mechanism includes an adjustment cap adapted for being easily manually adjusted with one hand to a desired adjusted position, and for being locked in the desired position with the same hand and without releasing the cap, to thereby maintain positive control over the adjusted position of the cap to avoid disturbing the desired setting.

It is a further more specific object of this invention to provide an adjustment and locking mechanism of the type described having an enlarged cap adapted for facilitating rotational adjustment of an adjustment shaft connected thereto, and which provides for locking the adjustment shaft against undesired rotation by moving the cap axially along the shaft between an unlocked and a locked position.

It is a further object of this invention to provide a mechanism of the type described which is of simple design and easily manufactured and assembled.

In accordance with this invention, a control device including a housing having an adjustment shaft rotatably mounted in and extending outwardly from an outer end portion of the housing is provided with an adjustment and locking mechanism which comprises an enlarged adjustment cap mounted for rotation with the adjustment shaft to facilitate rotation thereof. The cap is also mounted for axial movement along the adjustment shaft between a first axial position permitting rotational adjustment of the shaft and a second axial position locking the adjustment cap against undesired movement. The outer end portion of the housing is generally cylindrical in shape and is provided with a circumferentially arranged series of outwardly facing splines thereon. The adjustment cap is mounted on the adjustment shaft, as noted above, and has a collar portion surrounding the outer end portion of the housing. The collar portion is provided with a series of inwardly facing splines along the inner circumference thereof adapted for cooperating with the outwardly facing splines on the housing. With the adjustment cap axially positioned in the unlocked position, the opposing inwardly and outwardly facing splines permit rotational movement of the cap, while in the locked position of the adjustment cap, the opposing splines interlock one another and prevent rotational movement.

To facilitate accurate adjustment of the adjustment shaft, the inwardly facing splines are preferably normally positioned in opposing cooperating engagement with the outwardly facing splines, and the collar portion of the cap is of resilient construction to permit the inwardly facing splines on the collar portion to flex outwardly upon rotation of the cap and thereby allow the opposing splines to move past one another so as to provide incremental "click-stops" or detents. Means are provided for restricting the outward movement of the collar portion when the cap is in the locked axial position to thereby maintain the opposing splines in interlocking relation and prevent rotational movement of the adjustment shaft. A frictional catch is also provided in the adjustment and locking mechanism for positively retaining the adjustment cap in the locked position to prevent the same from being accidentally moved into the unlocked position.

Some of the objects and advantages of the invention having been stated, others will appear when the description proceeds when taken in connection with the accompanying drawings, in which FIG. 1 is a sectional view of an air line pressure regulator provided with an adjustment and locking mechanism in accordance with the invention;

FIG. 2 is a detailed exploded perspective view of the adjustment and locking mechanism of FIG. 1, with parts thereof broken away for clarity of illustration;

FIG. 3 is an enlarged sectional view showing the adjustment and locking mechanism of FIG. 1 in greater detail, with the adjustment cap thereof being shown in the unlocked axial positions;

FIG. 4 is an enlarged detailed view similar to FIG. 3 but with the adjustment cap being shown in the locked axial position;

FIG. 5 is a somewhat enlarged sectional view taken substantially along line 5—5 in FIG. 3; and FIG. 6 is a somewhat enlarged sectional view taken substantially along line 6—6 in FIG. 4.

For purposes of illustration, the adjustment and locking mechanism of this invention is shown and described herein as applied to an air line control device adapted for both filtering and regulating the pressure of compressed air supplied thereto. It will be readily understood, however, that the adjustment and locking mechanism is readily applicable to various other types of control devices.

The control device illustrated comprises a housing, generally indicated by the reference character 10, adapted for receiving pressurized air from an inlet 11 and for delivering filtered air at a regulated pressure from an outlet 12. The control device includes a filtering section of known construction, generally indicated at 13, located in the lower part of the housing and through which the pressurized air from inlet 11 passes for removing any solid particles and liquids therefrom. The control device also includes a pressure regulating section, generally indicated at 14, adapted for receiving the filtered air from filtering section 13 and delivering the same from outlet 12 at a preselected controlled outlet pressure regardless of fluctuations in the inlet pressure.

The pressure regulating section includes a piston 15 which is mounted in an inner cylindrical portion 16 of housing 10 and which is adapted for movement in response to a pressure differential on opposite sides of the piston. The piston 15 is operatively connected to a pressure valve and seat assembly, generally indicated at 17, which is opened and closed in response to movement of piston 15 so as to control the pressurized air permitted to pass from outlet 12. Piston 15 is biased downwardly as illustrated in FIG. 1 by a coil compression spring 18 having its lower end bearing against the upper side of piston 15 and its upper end engaging an axially adjustable upper abutment, to be described presently.

In order to permit adjusting the outlet pressure delivered from the pressure regulator, means are provided for adjusting the axial position of the upper abutment for spring 18. More particularly, an adjustment shaft 20 is rotatably mounted in and extends outwardly from an outer, generally cylindrical, end portion 21 of the housing. The lower portion of shaft 20 is externally threaded and has a hexagonal nut 22 threaded thereon which serves as the upper abutment for spring 18. As illustrated, the inner periphery 23 of the outer end portion 21 of the housing is of hexagonal cross-section corresponding to nut 22 so that rotation of adjustment shaft 20 adjusts the axial position of the nut 22 and thereby varies the compression exerted on the coil spring 18.

To facilitate manual adjustment of the shaft 20, an enlarged generally cylindrical adjustment cap 30 is mounted on the outwardly extending portion 24 of adjustment shaft 20. As illustrated, the outwardly extending portion 24 is of hexagonal cross-section and extends through a correspondingly shaped opening in the end wall of adjustment cap 30 so as to provide a driving engagement between the cap 30 and shaft 20 while permitting the cap to be moved axially along the shaft toward and away from the housing. The cap is retained on adjustment shaft 20 by a flange 25 at the outer end of the adjustment shaft.

As illustrated, the end wall of cap 30 is formed with a recessed portion 31 therein for receiving the flanged end portion of shaft 20. The inner surface of the recessed portion 31 is adapted to abut the outer end portion 21 of the housing and serve as a stop means for limiting the movement of cap 30 axially toward the housing. The depth of the recessed portion 31 is such that the flanged end portion 25 of shaft 20 does not protrude beyond the outer surface of the end wall of the cap upon axial movement of the cap along the shaft. The cylindrical cap 30 also includes a peripheral side wall 32 extending from end wall 31 and preferably being knurled or fluted on the exterior thereof to provide a gripping surface for facilitating manually adjusting the cap. Cap 30 also includes a collar portion 33 at one end of the cap located surrounding the cylindrical outer end portion 21 of the housing. The cap 30 also has an enlarged annular rib 34 formed on the outer surface of side wall 32 adapted for providing a ledge or finger hold to facilitate manually pulling the cap axially away from the housing.

In accordance with the illustrated embodiment, the adjustment cap may be easily locked against rotation in a desired adjusted position by pushing the cap axially toward the housing 10. When readjustment is necessary, the cap is pulled axially away from the housing. This locking function is brought about by opposing series of inwardly and outwardly facing splines 36, 26 located respectively on the collar portion 33 of cap 30 and on the outer end portion 21 of housing 10, which splines interlockingly engage one another when the adjustment cap is in the locked axial position to prevent rotation of the cap while being out of interlocking engagement with one another when the cap is axially positioned in the unlocked position.

Referring to FIG. 2, it will be seen that the collar portion 33 of the adjustment cap comprises a circularly arranged series of arcuately spaced legs 35 positioned surrounding the cylindrical outer end portion 21 of housing 10. Each of the legs 35 has a plurality of elongate axially extending radially inwardly facing splines 36 integrally formed on the inner surface thereof. The circularly arranged series of outwardly facing splines 26 is formed on the outer peripheral surface of the generally cylindrical outer end portion 21 of housing 10, with the splines extending generally parallel to the axis of rotation of shaft 20 and being adapted for cooperating with the radially inwardly facing splines 36 on cap 30.

An annular sleeve 27 is formed integrally with the housing surrounding the cylindrical outer end portion 21 thereof and is positioned in spaced apart relation therefrom so as to define an annular pocket 28 for receiving the legs 35 therein. Sleeve 27 preferably has a sufficient axial extent so as to always be positioned in protective surrounding relation around the lower portion of legs 35 throughout the axial movement thereof between the locked and unlocked positions.

As illustrated, the opposing inwardly and outwardly facing splines 36, 26 are so positioned as to remain in opposing engagement with each other throughout the axial movement of cap 30 along shaft 20. When the cap is axially positioned away from the housing in the unlocked position, the resilient legs 35 are permitted to flex outwardly within pocket 28 upon rotation of the shaft to allow the opposing splines to move past one another and to thus provide incremental "click-stops" or detents which facilitate accurate adjustment of the shaft. When cap 30 is moved axially toward the housing to the locked position, an angular camming surface 29 provided on the inner surface of sleeve 27 is adapted to engage the legs 35 and resist outward movement thereof, thereby maintaining the opposing splines in interlocking cooperating relation. Camming surface 29 defines a restricted opening into the inner portion of the pocket 28.

To insure that the cap 30 remains in the locked position when so positioned, the outer surface of each leg 35 is also provided with an angular camming surface 38 adapted for cooperating with the angular camming surface 29 on sleeve 27 when the adjustment cap is in the axially locked position for forming a frictional catch which serves to releasably retain the legs 35 in the inner portion of pocket 28. When cap 30 is in the locked position, the stop means provided by the inner surface of the recessed portion 31 of cap 30 limits the inward movement of the cap toward the housing and thereby prevents damage to the end portions of the resilient legs in the bottom of pocket 28.

While the opposing splined surfaces are illustrated as being adapted for remaining in opposing cooperating engagement throughout the axial movement of cap 30, it should be apparent that if the detent action of the splined surfaces is not desired, the length of the splines may be so coordinated as to position the splined surfaces out of physical engagement with one another when cap 30 is in the outward or unlocked position.

It will be readily appreciated that while the adjustment and locking mechanism of this invention has been illustrated and described herein with particular reference to an air line regulator and filter, the mechanism is useful in numerous other applications where it is desired to provide means for easily locking a rotatable adjustment shaft in a desired adjusted position.

In the drawing and specification there has been set forth a preferred embodiment of the invention, and although specific terms are employed, they are used in a generic and descriptive sense only and not for purposes of limitation.

That which is claimed is:

1. In an adjustable control device, such as an air line regulator, including a housing and an adjustment shaft rotatably mounted in and extending outwardly from an outer end portion of the housing, the combination therewith of means cooperating with said adjustment shaft to facilitate manual adjustment of the shaft and for locking the same in a desired adjusted position, said means comprising;

an adjustment cap mounted on said shaft in surrounding relation thereto and having means cooperating with said shaft for permitting effecting rotational movement of said shaft upon rotation being imparted to said cap, said cap being mounted on said shaft for axial movement therealong between a first axial position permitting rotational adjustment of said shaft and a second axial position locking the shaft against undesired rotational movement, said cap having a collar portion surrounding said outer end portion of said housing and said shaft and having a plurality of splines facing radially inwardly from the inner surface of said collar portion and extending along the collar portion generally parallel to the axis of said shaft, said outer end portion of said housing having a plurality of radially outwardly facing splines thereon adapted for cooperating with the inwardly facing splines on said cap, said cap when in said first axial position on said shaft so positioning said inwardly facing splines as to be out of interlocking engagement with said outwardly facing splines on said housing for permitting rotational adjustment of said shaft, said cap when in said second axial position on said shaft positioning said inwardly facing splines in interlocking relation with said outwardly facing splines on said housing for locking the shaft in a desired adjusted position, and means on said housing surrounding said outwardly facing splines in spaced apart relation therefrom for cooperating with said collar portion of said cap when said cap is in said second axial position for resisting outward flexure of said collar portion and thereby maintaining said splines in interlocking relation.

2. In an adjustable control device according to claim 1, wherein said cap when in said first axial position on said shaft positions said inwardly facing splines in opposing engagement with said outwardly facing splines on said housing, and wherein said collar portion of said adjustment cap is of resilient flexible construction so as to resiliently carry said inwardly facing splines and permit the same to be moved radially outwardly upon rotation of said cap to allow the opposing inwardly and outwardly facing splines to move past one another while providing a detent action facilitating accurate adjustment of said shaft.

3. In an adjustable control device according to claim 1, wherein said collar portion of said adjustment cap surrounding said outer end portion of said housing comprises a series of arcuately spaced resilient legs having said plurality of radially inwardly facing splines integrally formed on the respective inner surfaces thereof, and wherein said cap, when in said first axial position on said shaft, positions said inwardly facing splines in opposing engagement with said outwardly facing splines on said housing while permitting said resilient legs to flex outwardly upon rotation of said cap to thereby allow the opposing inwardly and outwardly facing splines to move past one another while providing a detent action facilitating accurate adjustment of said shaft.

4. In an adjustable control device according to claim 3, wherein said means on said housing surrounding said series of outwardly facing splines in spaced apart relation therefrom includes a sleeve defining with said outwardly facing splines a pocket for receiving said series of resilient legs therein, said sleeve having means on the inner surface thereof cooperating with said legs when said cap is in said second axial position on said shaft for resisting outward flexure of said legs and thereby maintaining said inwardly facing splines in interlocking relation with said outwardly facing splines.

5. In an adjustable control device according to claim 1, wherein said adjustment cap is of hollow, generally cylindrical construction and includes an end wall at one end thereof having an opening therein through which said adjustment shaft extends for mounting the adjustment cap on said shaft, and a generally cylindrical side wall extending from said end wall and providing a peripheral gripping surface facilitating manually adjusting said cap, and wherein said collar portion of said cap is integrally formed with said side wall at the opposite end of said cap from said end wall.

6. In an adjustable control device according to claim 5, wherein said adjustment shaft has means on the outer end thereof for limiting the axial movement of said adjustment cap along said shaft and thereby retaining the cap on said shaft, and wherein said end wall of said cap has a recessed portion therein for receiving said cap retaining means.

7. In an adjustable control device according to claim 6, wherein the inner surface of the recessed portion of said end wall is positioned so as to abut the outer end portion of said housing when said cap is in said second axial position on said shaft to thereby limit the axial movement of said cap toward said housing.

8. In an adjustable control device according to claim 5, wherein said cap has an enlarged annular rib formed on the outer surface of said cylindrical side wall for facilitating manually gripping the cap to move the same axially between said first and second positions on said shaft.

9. In an adjustable control device, such as an air line regulator, including a housing and an adjustment shaft rotatably mounted in and extending outwardly from an outer end portion of the housing, the combination therewith of means cooperating with said adjustment shaft to facilitate manual adjustment of the shaft and for locking the same in a desired adjusted position, said means comprising;

an adjustment cap mounted on said shaft in surrounding relation thereto and having means cooperating with said shaft for permitting effecting rotational movement to said shaft upon rotation being imparted to said cap, said cap being mounted on said shaft for axial movement therealong between a first axial position permitting rotational adjustment of said shaft and a second axial position locking the shaft against undesired rotational movement, said adjustment cap having a circularly arranged series of arcuately spaced resilient legs thereon surrounding said outer end portion of said housing, said legs each having a plurality of splines on the inner surface thereof facing radially inwardly toward said outer end portion of said housing and extending generally parallel to the axis of said shaft, said outer end portion of said housing having a circularly arranged series of radially outwardly facing splines thereon adapted for cooperating with the inwardly facing splines on said legs, said housing having an annular sleeve formed thereon surrounding said circularly arranged series of outwardly facing splines in spaced apart relation therefrom and defining an annular pocket therebetween for receiving said circularly arranged series of resilient legs therein, said cap when in said first axial position on said shaft positioning the inwardly facing splines on said legs in cooperating engagement with the outwardly facing splines on said housing while permitting the resilient legs to flex outwardly when the cap is rotated to thereby allow the opposing splines to move past one another and provide a detent action facilitating accurate adjustment of said shaft, and said annular sleeve having means on the inner surface thereof cooperating with said resilient legs when said cap is in said second axial position on said shaft for resisting outward flexure of said legs and thereby maintaining said inwardly facing splines in interlocking cooperating engagement with said outwardly facing splines and preventing rotational movement of the adjustment shaft.

10. In an adjustable control device according to claim 9, wherein said means on the inner surface of said sleeve cooperating with said resilient legs comprises means defining an angular camming surface defining a restricted opening into the inner portion of said pocket, and wherein said resilient legs each have means defining an angular camming surface on the outer periphery thereof adapted for cooperating with the angular camming surface on said sleeve when said adjustment cap is in said second axial position on said shaft to form a frictional catch for releasably retaining said resilient legs in the inner portion of said pocket with said inwardly facing splines in interlocking cooperating engagement with said outwardly facing splines.

* * * * *